United States Patent Office 3,491,169
Patented Jan. 20, 1970

3,491,169
OIL AND WATER REPELLENT
Stuart Raynolds, Wilmington, and Robert Emms Read, Newark, Del., assignors to E. I. du Pont de Nemours and Company, Wilmington, Del., a corporation of Delaware
No Drawing. Filed July 22, 1966, Ser. No. 567,050
Int. Cl. C08f 15/40
U.S. Cl. 260—900     11 Claims

ABSTRACT OF THE DISCLOSURE

A copolymer consisting essentially of recurring units obtained by polymerization of a mixture of monomers consisting of (a) from 55% to 70% by weight of a monomer of structure $$CH_2=C(CH_3)CO_2CH_2CH_2R_f$$

wherein $R_f$ is a perfluoroalkyl group of four to 14 carbons;

(b) from 29% to 45% by weight of at least one monomer of structure $CH_2=C(CH_3)CO_2R$ wherein R is n-alkyl of predominantly 12 carbons;

(c) from 0.1% to 0.5% by weight of a monomer of structure $$CH_2=CR'CO_2CH_2CH_2OH$$

wherein R' is H or $CH_3$; and (d) from 0% to 0.5% by weight of a monomer of structure $$CH_2=CR'CONHCH_2OH$$

said copolymer having an inherent viscosity of at least 0.25 as a 0.5% solution in 1,1,2-trichloro-1,2,2-trifluoroethane at 30° C.

---

This invention is directed to specific copolymers of the monomers $R_fCH_2CH_2O_2CC(CH_3)=CH_2$, designed specifically for use on deferred cure, permanent press garments.

U.S. Patent 2,974,432 describes a method, now receiving considerable commercial usage, for imparting a permanent press to a garment. This method first treats a cotton containing garment, or the fabric from which it is manufactured, with a polymerizable thermosetting resin (for example, urea-formaldehyde resins, melamine formaldehyde resins and others), needed catalyst and other adjuvants. After creases are applied where needed or desired, the resin is polymerized and crosslinked to give permanent creases. Garments treated according to the method of this patent may be laundered without loss of the desired creases and without introduction of undesired creases or wrinkles. The garments, therefore, should never require pressing. A number of other methods are known.

Belgium Patent 645,697 and British Patent 1,011,612 disclose oil and water repellent compositions for textiles based on the monomers $R_fCH_2CH_2O_2CC(CH_3)=CH_2$. The preferred composition, disclosed therein, consists of a mixture of a copolymer of $$CH_2=C(CH_3)CO_2CH_2CH_2R_f$$

$R_f$ is perfluoroalkyl of six to ten carbons, butyl acrylate and N-methylol acrylamide and a copolymer of 2-ethylhexyl methacrylate and N-methylol-acrylamide. Products based on such formulations give superior oil and water repellent finishes on textiles having a high degree of durability to laundering and dry-cleaning. For the best results, particularly the best oil repellency, fabrics treated with the above-mentioned formulations need pressing after laundering.

Garments having the permanent press characteristics do not require pressing after laundering, indeed this is the whole purpose of the treatment. Garments so treated which are also treated to obtain oil and water repellency with the compositions heretofore identified are unlikely to be pressed after laundering and as a result suffer a loss of efficiency in oil and water repellency.

It is an object of this invention to provide an oil and water repellent formulation for use with garments having the permanent press treatment heretofore described, said garment retaining a useful degree of oil and water repellency after laundering but without pressing. It is a further object to provide certain novel oil and water repellent polymers for use in said water and oil repellent formulations. A further object is to provide methods for treating appropriate textiles with such formulations.

These and other objects of the invention will be apparent from the following description and claims.

More specifically, the present invention is directed to a formulation consisting essentially of a copolymer obtained by polymerization of a mixture of monomers consisting of (a) from 55% to 70% by weight of a monomer of structure $$CH_2=C(CH_3)CO_2CH_2CH_2R_f$$

wherein $R_f$ is a perfluoroalkyl group of four to 14 carbons;

(b) from 29% to 45% by weight of at least one monomer of structure $CH_2=C(CH_3)CO_2R$ wherein R is n-alkyl of predominantly 12 carbons;

(c) from 0.1% to 0.5% by weight of a monomer of structure $$CH_2=CR'CO_2CH_2CH_2OH$$

wherein R' is H or $CH_3$; and (d) from 0% to 0.5% by weight of a monomer of structure $$CH_2=CR'CONHCH_2OH$$

said copolymer having an inherent viscosity of at least 0.25 as a 0.5% solution in 1,1,2-trichloro-1,2,2-trifluoroethane at 30° C.; and said polymerization being carried out in an aqueous emulsion system with free radical initiation.

This invention also relates to a polymer composition comprising (a) the copolymer heretofore defined; and
(b) a polymer derived from at least one polymerizable ester of methacrylic acid, said polymer composition containing at least 3% by weight of the monomer $CH_2=C(CH_3)CO_2CH_2CH_2R_f$, as heretofore defined in polymerized form.

An improved method for treating cellulosic textiles which comprises the improvement of adding the polymer composition as heretofore defined to the aqueous treating bath of U.S. Patent 2,974,432 and treating cellulosic textiles as described therein is also part of the present invention; as are cellulosic textiles obtained by the method of this invention.

This invention also encompasses the process for treating various fabrics to obtain permanent crease characteristics, the improvement being that which comprises adding the defined polymer composition to the aqueous treating bath containing the permanent crease reagents.

There are three basic systems for permanent press: (1) deferred cure as disclosed in U.S. 2,974,432; (2) recure or double cure as disclosed in U.S. 2,957,746, Textile Research Journal, 28, 242 (1958), and (3) fiber modification treatments, Textile Research Journal, 34, 9601 (1964). The various types of permanent press treatments are also described in: (1) American Dyestuff Reporter, 54, pp. 738–760 (1965) (seven articles) (September 1965, pp. 78–100), Textile Bulletin, April 1965, pp. 64–70; May 1965, pp. 52–62; August 1965, pp. 31–35; Modern Textile Magazine, April 1965, p. 46 et seq.; August 1965, p. 39 et seq., 44 et seq., and 46 et seq.; Textile Industry, June 1965, p. 116 et seq., and 120 et seq. These latter references are of a rather general nature.

The present invention consists of novel fluorinated copolymers, novel compositions containing said copolymers, a novel method for treating textiles with these compositions to obtain, i.e., a deferred cure, permanent press garments and the textiles obtained thereby.

The permanent press garments do not require pressing after laundering. Hence, when the housewife launders a garment and allows it to air dry, the garment is not subjected to any heating. This is, of course, the desirable feature of the treatment but it causes problems when the garment also contains oil and water repellent materials such as those heretofore identified. Fabrics treated with these resins lose much of their oil repellency on laundering which is restored by pressing. The problem faced was to improve the oil and water repellent composition herein identified so that pressing or other heating was not required to maintain useful oil repellency and, at the same time maintain the initially high oil and water repellency desired. It has now been discovered that only certain highly specific compositions meet these requirements; these are described below.

It should also be understood that permanent press garments may also be dried in home drying equipment and must maintain their beneficial properties when so treated.

The copolymer utilized according to the present invention is obtained by polymerization of monomer mixtures consisting of (a) from 55% to 70% by weight of monomers of structure $$CH_2=C(CH_3)CO_2CH_2CH_2R_f$$

(b) from 29% to 45% of one or more monomers of structure $$CH_2=C(CH_3)CO_2R$$

(c) from 0.1% to 0.5% of a monomer of structure $$CH_2=CR'CO_2CH_2CH_2OH$$

and (d) from 0% to 0.5% of a monomer of structure $$CH_2=CR'CONHCH_2OH$$

The polymerization is carried out in an aqueous emulsion system with free radical initiation. $R_f$ of the monomer $CH_2=C(CH_3)CO_2CH_2CH_2R_f$ is a perfluoroalkyl group of four to 14 carbons. $R_f$ may be either straight chain or branched chain perfluoroalkyl. The straight chain perfluoroalkyl groups $F(CF_2)_n-$ wherein $n$ is from four to 14 are preferred. The copolymer may be derived from the monomer $$CH_2=C(CH_3)CO_2CH_2CH_2R_f$$

having $R_f$ as a single species, say prefluorooctyl, or may be derived from a mixture of monomers $$CH_2=C(CH_3)CO_2CH_2CH_2R_f$$

where $R_f$ is a mixture of species, say prefluorobutyl, perfluorohexyl, perfluorooctyl and perfluorodecyl.

The monomers $CH_2=C(CH_3)CO_2CH_2CH_2R_f$ are prepared by esterification of alcohol $R_fCH_2CH_2OH$ with methacrylic acid or the corresponding acid halide, transesterification with an alkyl methacrylate, both methods being described in copending U.S. Patent 3,282,905, filed Feb. 9, 1965 which corresponds to British Patent 971,732, French Patent 1,356,923 or Belgian Patent 635,437, or by reaction of $R_fCH_2CH_2I$ with potassium methacrylate in tert.-amyl alcohol as described in U.S. Patent 3,239,557; said British and French patents describe how to obtain such monomers wherein $R_f$ is both straight and branched chain and their disclosure is incorporated herein by reference.

The copolymers must be prepared from monomer mixtures containing at least 55% by weight of the monomers $$CH_2=C(CH_3)CO_2CH_2CH_2R_f$$

to have the desired oil and water repellent properties in the polymer compositions of this invention. The upper limit of 70% is fixed by requirements for the comonomers. The preferred copolymers contain 60% to 67% of the monomer $$CH_2=C(CH_3)CO_2CH_2CH_2R_f$$

where $R_f$ is a mixture of normal perfluoroalkyl groups of six to ten carbons.

The copolymers contain from 29% to 45% by weight of one or more monomers $$CH_2=C(CH_3)CO_2R$$

wherein R is a normal alkyl group of predominantly 12 carbons. Thus, pure dodecyl methacrylate may be used or the commercial lauryl methacrylate which contains a majority of n-dodecyl methacrylate.

The copolymers of this invention must be prepared from monomer mixtures containing at least 29% by weight of the monomer $CH_2=C(CH_3)CO_2R$ if the polymer composition is to have the necessary properties for the intended purpose. The upper limit of 45% is fixed by the requirements for the other comonomers.

The copolymer monomer mixture must also contain from 0.1% to 0.5% by weight of $$CH_2=CR'CO_2CH_2CH_2OH$$

and, optionally, 0.1 to 0.5% by weight of $$CH_2=CR'CONHCH_2OH$$

In each case, R' may be hydrogen or methyl, hence these monomers are 2-hydroxyethyl acrylate, 2-hydroxyethyl methacrylate N-methylol acrylamide and N-methylol methacrylamide. 2-hydroxyethyl methacrylate and N-methylol acrylamide are preferred, each at 0.25% concentration. These monomers impart laundering and dry cleaning durability to the composition; at least 0.1% of each is necessary. More than 0.5% of either produces undesirable effects, particularly on repellencies after laundering. Omission of the hydroxyalkyl monomer produces undesirable effects on results.

These copolymers may be prepared using art emulsion-free radical polymerization methods for acrylic type monomers. An aqueous emulsion polymerization using a cationic quaternary ammonium salt or tertiary amine acid salt as the emulsifying agent and azobis(isobutyramidine)-dihydrochloride initiator is preferred. It is usually preferable to preemulsify the water-insoluble monomers in a homogenizer as described in Netherlands application 6501472, laid open for inspection ca. Feb. 12, 1966. The concentration of emulsifying agent should not exceed about 8–10% of the weight of monomers; higher concentrations may adversely effect oil and water repellency.

The molecular weight of the copolymer, as indicated by inherent viscosity, is of some importance. The copolymer obtained by emulsion polymerization without addition of molecular weight modifiers such as dodecyl mercaptan is useful for most purposes. A minimum inherent viscosity of at least 0.25 is preferable. Inherent viscosities are determined as 0.5% by weight solutions in 1,1,2-trichloro-1,2,2-trifluoroethane solution at 30° C., using the equation $$n_i = \frac{1}{C} \ln \left[ \frac{n}{n_0} \right]$$

wherein $n_i$ is the inherent viscosity, ln is the natural logarithm, $n$ is the measured viscosity of the 0.5% solution, $n_0$ is the viscosity of the solvent and C is the concentration of copolymer in g./100 ml. solution. The preferred polymerization process uses about 0.12 to 0.15% dodecyl mercaptan, based on total monomer weight, giving inherent viscosities in the range 0.5 to 0.6.

The fluorinated copolymer described above may be combined with a polymer of an ester or esters of methacrylic acid to form the oil and water repellent composition of this invention.

Representative examples of these ester monomers include: methyl methacrylate; propyl methacrylate; butyl methacrylate; isoamyl methacrylate; 2-ethylhexyl methacrylate; octylmethacrylate; octadecyl methacrylate; lauryl methacrylate and cetyl methacrylate. The preferred monomer is 2-ethylhexyl methacrylate.

The above monomers may be used alone or as mixtures of two or more monomers. It is generally preferred to add a small amount of a monomer of structure $CH_2{=}CR'CONHCH_2OH$ or $CH_2{=}CR'CO_2CH_2CH_2OH$, say 0.1 to 0.5% by weight, to enhance durability to laundering and drycleaning. In addition, small amounts, less than 1% of dimethacrylic esters of glycols such as ethylene dimethacrylate may be added.

The methacrylic ester polymers are prepared by any known art methods for polymerizing such monomers. In general, an emulsion polymerization system is preferred since the polymer is obtained in a useful emulsion form. The same methods may be used for these polymers as those for the fluorine containing copolymers described earlier.

The oil and water repellent composition of this invention consists of a mixture of the copolymer containing the monomers

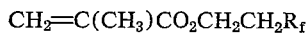
$$CH_2{=}C(CH_3)CO_2CH_2CH_2R_f$$

and, optionally, the methacrylic ester polymer. Any mixture of these two types of polymers is useful so long as it contains at least 3% by weight of the monomers

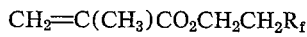
$$CH_2{=}C(CH_3)CO_2CH_2CH_2R_f$$

in polymerized form. Since the fluorinated copolymers themselves contain at most 70% of the monomers

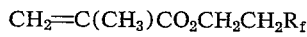
$$CH_2{=}C(CH_3)CO_2CH_2CH_2R_f$$

the mixture of polymers can contain no more fluorinated monomer than the fluorinated copolymer, a maximum of 55% to 70%. In general, it is preferred that the mixture of polymers contain about 40% of the fluorinated monomer in polymerized form.

Application of the above described polymer composition to cellulosic fabrics using the methods taught in Belgian Patent 645,697 and British Patent 1,011,612, produces excellent oil and water repellency; unlike the compositions described in these patents, however, the compositions of this invention are useful for obtaining permanent crease fabrics such as in the process of U.S. Patent 2,974,432. The compositions of this invention retain to a considerable degree their oil and water repellency after laundering and air drying (without heating) while those heretofore referred to largely lose oil repellency unless heat is applied. The oil repellency of the referenced compositions are usually restored by tumble drying at 150 to 160° F.

The reagent described by U.S. Patent 2,974,432 are polymerizable melamine-formaldehyde and urea-formaldehyde condensates. The patent describes an aqueous bath containing both types. A particularly useful resin is obtained by condensing glyoxal, urea and formaldehyde, as described in U.S. Patent 3,049,446. This resin is believed to have the structure:

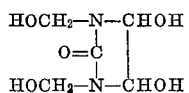

The aqueous bath also contains an acid catalyst to polymerize the resin at the proper time. The aqueous bath is applied to the textile and the textile dried. It is then fabricated into a garment, the desired creases applied and the garment cured into permanent press form by heating at 300° F. or above.

To use the compositions of this invention, the polymer mixture is added as an aqueous dispersion to the aqueous bath containing the above mentioned resins. If considerable pot life is necessary, a nonionic dispersant such as an alkyl-phenol ethylene oxide adduct should also be added. Less than 1.0% is usually needed. The bath is applied to textiles and garment cured as described above.

It is generally desirable that the fabric contain at least 0.1% by weight of the monomers $$CH_2{=}C(CH_3)CO_2CH_2CH_2R_f$$

in polymerized form. Usually no more than 1% need be used. As indicated in U.S. Patent 2,974,432, the bath may also contain other adjuvants such as softeners and the like. In addition, supplemental water repellents and other adjuvants may be added if they do not interfere with the permanent press resins.

The following examples are representative and illustrate the present invention.

EXAMPLE I (A) Polymerization procedure

Dimethyl di(hydrogenated tallow)ammonium chloride (Aliquat H226—General Mills) (6.25 g., 0.45% on weight of monomers=OWM) was dissolved in 2.37 g. water with agitation. Then 1003.4 g. (66.5% OWM) 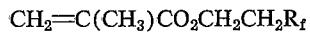 $CH_2{=}C(CH_3)CO_2CH_2CH_2(CF_2)_nF$, $n=6$, 8 and 10 in weight ratio 3:2:1 containing less than 10% $n=12$ and 14, and 497.9 g. (33.0% OWM) of commercial lauryl methacrylate (60% n-dodecyl, 27% n-tetradecyl, 7% lower esters, 6% higher esters, mol. wt. 262) were added and homogenized with the aqueous solution. Water (1650 g.) in a separate container was degassed with nitrogen and boiling, then added to the above monomer dispersion. Dodecyl mercaptan (2.25 g., 0.15% OWM), 6.28 g. (0.25% OWM) of a 60% aqueous solution of N-methylolacrylamide and 3.77 g. (0.25% OWM) of 2-hydroxyethyl methacrylate were added, the mixture was heated to 60° C. with agitation and 1.1 g. (0.07% OWM) azobis-(isobutyramidine dihydrochloride) were added. The polymerization initiated and heating at 60° to 70° F. was continued until complete (4–5 hours). The resulting aqueous dispersion contained approximately 28% solids.

Using the same general procedure, polymerizations I–B to I–G were carried out using the reactant concentrations shown below:

The concentrations of N-methylolacrylamide and 2-hydroxyethyl methacrylate were 0.25% OWM and the concentration of azobis (isobutyramidine dihydrochloride) 0.06% to 0.07% OWM in all cases.

| Ex. | $CH_2{=}C(CH_3)CO_2CH_2CH_2(CF_2)_nF$, percent OWM | Lauryl Methacrylate, percent, OWM | Dodecyl mercaptan, percent OWM |
|---|---|---|---|
| I–B | 66.0 | 33.0 | 0.15 |
| I–C | 66.0 | 33.0 | 0.30 |
| I–D | 49.5 | 49.5 | 0.12 |
| I–E | 80.0 | 20.0 | 0.15 |
| I–F | 39.75 | 59.75 | 0.15 |
| I–G | 19.75 | 79.75 | 0.15 |

A copolymer of 99.5% 2-ethylhexyl methacrylate and 0.5% N-methylol acrylamide was prepared, giving an aqueous dispersion. Each of the polymer dispersions from Examples I-A to I-G were blended with the above copolymer to contain 13.5% solids and 40 parts of $$CH_2=C(CH_3)CO_2=CH_2CH_2(CF_2)_nF$$

in polymerized form per 100 parts of solids.

EXAMPLES II-A to II-G

Two pad baths were prepared from each of the 13.5% solids dispersions prepared in Examples I-A to I-G. One series of baths contained 4.0% on weight of bath (=OWB) of the dispersion (equivalent to 0.540% solids OWB) and 4.0% OWB of a 27% zinc nitrate solution, the other series contained 5.0% OWB of the dispersion (0.675% OWB of solids) and 5.0% OWB of the 27% zinc nitrate solution. All baths contained 24% OWB of Permafresh 183, 6% OWB of a melamine derivative as described below and 0.06% of a nonylphenoxy(ethyleneoxy)ethanol ("Igepal" 890 which is $$C_9H_{19}-C_6H_4O(CH_2CH_2O)_{40}H$$

or "Igepal" 990 which is $C_9H_{19}-C_6H_4O(CH_2CH_2O)_{100}H$, both sold by Antara Chemical Company). The baths for Examples F and G contained the same weight of the hy- a permanent crease resin sold by Sun Chemical, believed to have the structure:

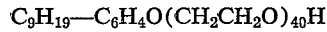

sold by Armour Industrial Chemicals Company.

Permafresh 183 is an aqueous solution (40% solids) of a permanent crease resin sold by Sun Chemical, believed to have the structure:

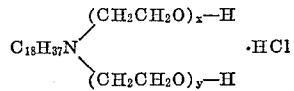

The melamine derivative is a 25% dispersion of solids in water. The solids consist of 47.5% paraffin wax, 47.5% tris(methoxymethyl)tris (behenoyloxymethyl) - melamine and 5% dimethyl-fatty-amine acetates. The baths will thus contain 0.7125% OWB of the melamine solids and 0.7125% OWB of paraffin wax.

Each of the 14 resulting baths was used to treat three types of fabrics to give approximately 50% wet pickup. The fabric samples were then air dried and cured at about 350° F. as taught in U.S. Patent 2,974,432.

The three types of fabrics represent different weaves and degrees of difficulty for application. The three types were: (1) Chem. 119— a 65/35 "Dacron" polyester/cotton poplin vat dyed tan—from Fairforest Mills; (2) Chem. 118—a 65/35 "Dacron" polyester/cotton poplin sulfur dyed black—from Fairforest Mills; (3) Chem. 112—a 65/35 "Dacron" polyester/cotton poplin "Thermosol dyed" tan—from Fairforest Mills.

Each of the resulting 42 fabric samples was treated for oil and water repellency using the procedures described below. Each sample was then divided into three portions; one portion was subjected to the home laundering air dry test, the second to the home-laundering tumble dry test and the third to the dry-cleaning test described below. The samples were then retested for repellency.

In all cases, the repellencies after dry-cleaning indicated that substantially all of the initial oil repellency is retained while the water repellencies were slightly lower, as is usually the case when oil and water repellent fabrics are dry-cleaned.

The result of the other test are shown in Table I.

TABLE I

| Example | 13.5% Fluoropolymer dispersion, percent OWB | Results Chem 119 Initial | | Repellencies | | | | Results Chem 118 Initial | | Repellencies | | | | Results Chem 112 Initial | | Repellencies | | | |
|---|---|---|---|---|---|---|---|---|---|---|---|---|---|---|---|---|---|---|---|
| | | | | 1 HLAD a | | 1 HLTD b | | | | 1 HLAD a | | 1 HLTD b | | | | 1 HLAD a | | 1 HLTD b | |
| | | Oil | Water | Oil | Water | Oil | Water | Oil | Water | Oil | Water | Oil | Water | Oil | Water | Oil | Water | Oil | Water |
| II-A | 4.0 | 7 | 100 | 3 | 70 | 5 | 80 | 7 | 100 | 4 | 70 | 5 | 80+ | 7 | 100 | 3 | 70 | 5 | |
| | 5.0 | 7 | 100 | 4 | 70 | 6 | 70 | 6 | 100 | 2 | 70 | 5 | 100 | 6 | 100 | 3 | 70 | 5 | |
| II-B | 4.0 | 7 | 80+ | 4 | 70+ | 7 | 70+ | 7 | 90 | 4 | 80 | 5 | 80 | 7 | 100 | 4 | 70 | 6 | |
| | 5.0 | 7 | 90+ | 4 | 70+ | 4 | 80 | 7 | 100 | 4 | 70+ | 5 | 90 | 7 | 100 | 4 | 70 | 5 | |
| II-C | 4.0 | 7 | 90+ | 4 | 70 | 5 | 80 | 6 | 100 | 3 | 70 | 5 | 80+ | 7 | 90+ | 4 | 70 | 6 | |
| | 5.0 | 7 | 100 | 5 | 80 | 4 | 80 | 7 | 100 | 3 | 70 | 5 | 80 | 7 | 100 | 4 | 50 | 5 | |
| II-D | 4.0 | 5 | 80 | 3 | 70 | 4 | 70 | 5 | 80 | 3 | 70 | 4 | 80 | 5 | 80 | 3 | 70 | 4 | |
| | 5.0 | 5 | 80 | 3 | 70 | 4 | 70+ | 6 | 80+ | 3 | 70 | 4 | 80 | 5 | 80 | 4 | 70 | 4 | |
| II-E | 4.0 | 7 | 100 | 2 | 70 | 5 | 70 | 6 | 100 | 0 | 70 | 5 | 90+ | 7 | 100 | 0 | 70 | 4 | |
| | 5.0 | 7 | 100 | 2 | 70 | 4 | 70+ | 6 | 100 | 2 | 70 | 5 | 100 | 7 | 100 | 2 | 70 | 4 | |
| II-F | 4.0 | 4 | 70+ | 0 | 70/0 | 2 | 70 | 4 | 80 | 3 | 70 | 4 | 70+ | 4 | 70+ | 2 | 70 | 3 | |
| | 5.0 | 4 | 70+ | 0 | 70/0 | 3 | 70 | 4 | 70 | 3 | 70 | 4 | 70+ | 4 | 70+ | 2 | 70 | 3 | |
| II-G | 4.0 | 2 | 70 | 0 | 50 | 0 | 70 | 2 | 70 | 0 | 70 | 2 | 70 | 2 | 70 | 0 | 50 | 2 | |
| | 5.0 | 2 | 70 | 0 | 50 | 2 | 70 | 2 | 70 | 0 | 70 | 2 | 70 | 2 | 70 | 0 | 50 | 0 | | a All baths applies 50% wet pickup on weight of fabric (OWF); constituent weights OWF=½ weights OWB.
b 1 HLAD=home laundering air dry; 1 HLTD=home laundering tumble dry.

The oil repellency test comprises placing a drop of test solution carefully on the textile on a flat horizontal surface. After three minutes, any penetration or wicking into the fabric is noted visually. The nature of the test solutions is shown below; Nujol, of course, is a purified petroleum oil. Anything with a rating of 5 or greater is good or excellent, anything with a rating of 2 or over can be used for certain purposes. As an example, if treated fabric repels the No. 2-6 solutions but not the No. 7 solution, its rating is 6.

The water repellency test is the American Association of Textile Chemists and Colourists Standard Test Method 22-1952 (ASTM D-583-63).

| Oil repellency rating | Test solution | Surface tension, dynes/cm. at 25° C. |
|---|---|---|
| 9 | n-Heptane | 20.0 |
| 8 | n-Octane | 21.8 |
| 7 | n-Decane | 23.5 |
| 6 | n-Dodecane | 25.0 |
| 5 | n-Tetradecane | 26.7 |
| 4 | 50-50 hexadecane-Nujol | 28.7 |
| 3 | 25-75 hexadecane-Nujol | 30.3 |
| 2 | Nujol | 31.2 |

Home laundering tests

A Kenmore washer Model 600 is loaded with a 4-lb. load, with 29 g. of Tide. The wash is set at hot (12 min. cycle) and a warm rinse (12 min.). The total washing and rinsing time is 40 minutes. In the home laundering air dry test, the spun dry fabrics are dried at ambient temperatures. In the home laundering tumble-dry test, the spun dry fabrics are dried at 156°-160° F. in a home drier with tumbling.

Dry-cleaning tests

The dry-cleaning test consists of agitating the sample for 120 minutes in tetrachloroethylene containing 1.5% (weight volume) of a commercial dry cleaning detergent (R. R. Street Co., 886 Detergent), extraction with tetrachloroethylene, drying for three minutes at 66° C. in a drum and followed by a 15 second pressing at 149° C. on each side of the fabric.

To judge whether a formulation was useful or not, the following standards of minimum acceptability as defined by the trade, were used:

initial repellency: oil, 5 or more; water, 80+ or more
after one home laundering, air dry: oil, 2 or more; water, 70 or more
after one home laundering, tumble dry at 152–160° F.: oil, 4 or more; water, 70 or more.

dispersions, one series containing 4.0% OWB of the dispersions (0.540% OWB of solids) and the other containing 5.0% OWB of the dispersions (0.675% OWB solids). All baths contained 5.0% OWB of the 27% zinc nitrate solution, 28.0% OWB Permafresh 183, 6.0% of the melamine derivative-paraffin wax dispersion of Example II and about 3.9% based on weight of polymer solids of the Ethomeen hydrochloride dispersing agent of Example II. Samples of fabrics Chem. 119, Chem. 118 and Chem. 112 were again treated to obtain 50% wet pickup, dried, cured and tested for repellencies as described in Example II. The results are shown in Table II.

TABLE II

| Example | 13.5% Fluoropolymer dispersion, percent OWB | Results Chem 119 Initial | | Repellencies | | | | Results Chem 118 Initial | | Repellencies | | | | Results Chem 112 Initial | | Repellencies | | | |
|---|---|---|---|---|---|---|---|---|---|---|---|---|---|---|---|---|---|---|---|
| | | | | 1 HLAD[b] | | 1 HLTD[b] | | | | 1 HLAD[b] | | 1 HLTD[b] | | | | 1 HLAD[b] | | 1 HLTD[b] | |
| | | Oil | Water | Oil | Water | Oil | Water | Oil | Water | Oil | Water | Oil | Water | Oil | Water | Oil | Water | Oil | Water |
| III-A | 4.0 | 8 | 100 | 4 | 70 | 6 | 80 | 7 | 100 | 4 | 70 | 5 | 90 | 7 | 100 | 4 | 70 | 6 | 80 |
|  | 5.0 | 7 | 100 | 4 | 70+ | 7 | 80+ | 7 | 100 | 3 | 70 | 5 | 90− | 8 | 100 | 4 | 70 | 6 | 80+ |
| III-B | 4.0 | 7 | 80+ | 4 | 70 | 7 | 70+ | 7 | 100 | 4 | 70 | 6 | 80 | 7 | 90 | 4 | 75 | 7 | 80 |
|  | 5.0 | 8 | 100 | 4 | 70 | 7 | 80 | 7 | 100 | 4 | 70 | 6 | 80 | 8 | 100 | 4 | 70 | 7 | 80 |
| III-C | 4.0 | 7 | 90 | 4 | 75 | 6 | 70+ | 7 | 100 | 4 | 70 | 6 | 80+ | 7 | 80+ | 4 | 70− | 6 | 70+ |
|  | 5.0 | 7 | 90− | 4 | 70 | 6 | 80 | 7 | 100 | 4 | 70 | 5 | 90 | 8 | 90 | 4 | 70 | 5 | 80 |
| III-D | 4.0 | 8 | 100 | 4 | 70 | 7 | 70+ | 7 | 100 | 3 | 70− | 6 | 80+ | 8 | 90+ | 4 | 70 | 6 | 80 |
|  | 5.0 | 8 | 100 | 4 | 70+ | 7 | 80 | 7 | 100 | 4 | 70 | 6 | 90+ | 8 | 100 | 4 | 70 | 6 | 80 | a All baths applied 50% wet pickup on weight of fabric (OWF); constituent weights OWF=1/2 weights OWB.
b 1 HLAD=home laundering air dry; 1 HLTD=home laundering tumble dry.

Note that Examples A through C meet all requirements. While Examples F and G fail to meet initial repellency requirements, Examples D fails to meet the home laundering tumble dry requirement on Chem. 119 and Example E fails to meet the home laundering, air dry requirements on Chem. 118 and 112.

EXAMPLE III A–D

Using the polymerization procedure of Example I, four polymers were prepared from essentially pure n-dodecyl methacrylate. All four polymerizations contained 0.25% OWM N-methylolacrylamide, 0.25% OWM 2-hydroxyethyl methacrylate and 0.04% OWM of the initiator of Example I. The other proportions are shown below:

| | $CH_2=C(CH_3)CO_2CH_2CH_2(CF_2)_nF$, percent OWM | n-Dodecyl methacrylate, percent OWM | Dodecyl mercaptan, percent OWM |
|---|---|---|---|
| A | 69.75 | 29.75 | 0.15 |
| B | 69.75 | 29.75 | 0.30 |
| C | 64.65 | 34.85 | 0.15 |
| D | 64.65 | 34.85 | 0.30 |

Each of the four resulting polymer dispersions was blended with the 2-ethylhexyl methacrylate, N-methylol acrylamide copolymer dispersion to give eight dispersions containing 13.5% solids and 40 parts $$CH_2=C(CH_3)CO_2CH_2CH_2(CF_2)_nF$$

per 100 parts solids.

Two pad baths were prepared from each of these four

EXAMPLE IV A–E

The polymerization procedure of Example I was repeated using varying amounts of dimethyloctadecylamine acetate dispersing agent. In all cases, 0.25% OWM of each of N - methylolacrylamide and 2 - hydroxyethyl methacrylate, 0.06 to 0.07% OWM of the initiator of Example I and 0.15% OWM of dodecylmercaptan were used. The other conditions are shown below:

| | $CH_2=C(CH_3)CO_2CH_2CH_2(CF_2)_nF$, percent OWM | Commercial lauryl methacrylate, percent OWM | Dispersing agent, percent OWM |
|---|---|---|---|
| A | 69.5 | 33.6 | 6 |
| B | 69.5 | 33.6 | 8 |
| C | 69.5 | 33.6 | 10 |
| D | 59.75 | 39.75 | 8 |
| E | 54.75 | 44.75 | 8 |

Each of the resulting polymer dispersions was combined to form the 13.5% solids dispersions as described in Example I. Then two series of pad baths containing 4.0 and 5.0% OWB of these dispersions (0.540 and 0.675% solids OWB) and 4.0 or 5.0% OWB of the 27% zinc nitrate solution were prepared, otherwise having the compositions of the baths of Example II, "Igepal" dispersant was used for A, Ethomeen hydrochloride for B–E. These baths were applied to Chem. 119, Chem. 118 and Chem. 112 and the treated fabrics tested as described in Example II. The result of the dry-cleaning tests were the same as Example II. The results are otherwise shown in Table III.

TABLE III

| Example | 13.5% Fluoro-polymer dispersion, percent OWB | Results Chem 119 Initial | | Repellencies | | | | Results Chem 118 Initial | | Repellencies | | | | Results Chem 112 Initial | | Repellencies | | | |
|---|---|---|---|---|---|---|---|---|---|---|---|---|---|---|---|---|---|---|---|
| | | | | 1 HLAD [b] | | 1 HLTD [b] | | | | 1 HLAD [b] | | 1 HLTD [b] | | | | 1 HLAD [b] | | 1 HLTD [b] | |
| | | Oil | Water | Oil | Water | Oil | Water | Oil | Water | Oil | Water | Oil | Water | Oil | Water | Oil | Water | Oil | Water |
| IV-A | 4.0 | 7 | 80 | 4 | 70 | 4 | 70 | 7 | 90 | 4 | 80 | 5 | 80 | 7 | 100 | 4 | 70 | 6 | 80 |
| | 5.0 | 7 | 90 | 4 | 70 | 4 | 80 | 7 | 100 | 4 | 70+ | 5 | 90 | 7 | 100 | 4 | 70 | 5 | 80 |
| IV-B | 4.0 | 6 | 100 | 2 | 70 | 4 | 70 | 6 | 100 | 2 | 70 | 4 | 80 | 6 | 100 | 2 | 70 | 4 | 80 |
| | 5.0 | 6 | 100 | 2 | 70 | 4 | 70 | 5 | 100 | 3 | 70 | 4 | 70 | 6 | 100 | 2 | 70 | 4 | 80 |
| IV-C | 4.0 | 6 | 100 | 2 | 70 | 4 | 70 | 5 | 100 | 3 | 70 | 4 | 80 | 6 | 100 | 0 | 70 | 4 | 70 |
| | 5.0 | 6 | 100 | 2 | 70 | 4 | 70 | 5 | 100 | 3 | 70 | 4 | 80 | 6 | 100 | 2 | 70 | 4 | 80 |
| IV-D | 4.0 | 5 | 100 | 2 | 70 | 4 | 80 | 5 | 100 | 0 | 70 | 4 | 100 | 6 | 100 | 2 | 70 | 4 | 80 |
| | 5.0 | 5 | 100 | 2 | 70 | 4 | 90— | 5 | 100 | 0 | 70 | 4 | 100 | 6 | 100 | 3 | 70 | 4 | 70 |
| IV-E | 4.0 | 5 | 100 | 2 | 70 | 4 | 80 | 5 | 100 | 2 | 70 | 4 | 80 | 6 | 100 | 2 | 70 | 4 | 80 |
| | 5.0 | 6 | 100 | 3 | 70 | 4 | 70+ | 5 | 100 | 2 | 70 | 4 | 90 | 6 | 100 | 3 | 70 | 4 | 70 |

[a] All baths applied 50% wet pickup on weight of fabric (OWF); constituent weights OWF=½ weights OWB.
[b] 1 HLAD=home laundering air dry; 1 HLTD=home laundering tumble dry.

EXAMPLE V

Using the polymerization procedure of Example I, a number of fluorinated polymers were prepared. In all cases, except B, dimethyloctadecylamine acetate dispersant was used; B used dimethyldi(hydrogenated tallow) ammonium chloride. The monomers used and ratios are shown in the table. Stearyl methacrylate is a commercial product containing 34% $C_{16}$, 64% $C_{18}$ and 2% $C_{14}$ esters, mole weight 332.

The above preceding representative examples show that the copolymers and polymer compositions of the present invention are significantly useful with permanent press finishes on textiles while those of the art are not.

Many different fibrous materials may be treated in the practice of this invention; cellulosic fibers, blends of same with various synthetic fibers such as nylon, polyacrylonitrile and polyester fibers; blended synthetic fibers and unblended synthetic fibers may also be treated. These

| | $CH_2=C(CH_3)CO_2CH_2CH_2(CF_2)_nF$, percent OWM | Comonomer, percent [a] | Percent OWM | MAM/HEMA [b], percent OWM | Dodecyl mercaptan, percent, OWM |
|---|---|---|---|---|---|
| V-A | 66.0 | BuA | 39.4 | 0.5/0 | 0.3 |
| V-B | 66.0 | EHMA | 33.3 | 0.25/0.25 | 0.13 |
| V-C | 60.0 | BuMA | 40.0 | 0.5/0 | 0.12 |
| V-D | 61.0 | SMA | 38.5 | 0.29/0.29 | 0.3 |
| V-E | 80.0 | BuA | 10.0 | 0.5/2 | 0 |
| V-F | 89.6 | BuA | 9.6 | 0.4/0.4 | 0 |
| V-G | 80.0 | BuA | 20.0 | 0.4/0 | 0 |
| V-H | 80.0 | BuA | 20.0 | 0.4/0.4 | 0 |
| V-J | 80.0 | BuA | 20.0 | 0.5/0 | 0 |
| V-K | 90.0 | BuA / GMA | 10.0 / 5.0 | 0/0 / 0/0 | 0 |
| V-L | 80.0 | BuA / GMA | 20.0 / 5.0 | 0/0 | 0 |
| V-M | 81.5 | EHA | 28.5 | 0.5/0 | 0 |

[a] BuH=butyl acrylate, EHMA=2-ethylhexyl methacrylate, BuMA=butyl methacrylate, SMA=stearyl methacrylate. GMA=glycidyl methacrylate, EHA=2-ethylhexyl acrylate.
[b] MAM=N-methylolacrylamide, HEMA=2-hydroxyethyl methacrylate.

The resulting polymer dispersions were combined with the 2-ethylhexyl methacrylate copolymer of Example I to form 13.5% solids dispersions. Pad baths were prepared containing 24% OWB Permafresh 183, 8% OWB of the melamine derivative paraffin wax dispersion of Example II, 0.06% OWB "Igepal" dispersant and either 4.0% OWB or 5.0% OWB of the 13.5% solids dispersions (0.540% or 0.675% OWB solids respectively) and the corresponding weights of the 27% zinc nitrate solution. These were applied to Chem. 119, Chem. 118 and Chem. 112, dried, cured and tested as described in Example II. The dry-cleaning results were the same as Example II. The other results are shown in Table IV.

fibrous materials may also have been dyed, etc., prior to treatment in accordance with our invention.

Our fluorinated interpolymer may be combined, as heretofore described, with a polymer derived from at least one polymerizable ester of methacrylic acid; this polymeric ester functions as an extender polymer to permit the use of less amounts of fluorinated copolymer with the proviso that there must result a deposition of at least 0.1% of fluorinated copolymer on the weight of the fabric being treated to achieve our desired results.

The permanent crease resins which are embodied in the practice of the present invention are those known in the trade and herein identified and utilized in the numerous TABLE IV [a]

| Example | 13.5% Fluoro-polymer dispersion, percent OWB | Results Chem 119 Initial | | Repellencies | | | | Results Chem 118 Initial | | Repellencies | | | | Results Chem 112 Initial | | Repellencies | | | |
|---|---|---|---|---|---|---|---|---|---|---|---|---|---|---|---|---|---|---|---|
| | | | | 1 HLAD [b] | | 1 HLTD [b] | | | | 1 HLAD [b] | | 1 HLTD [b] | | | | 1 HLAD [b] | | 1 HLTD [b] | |
| | | Oil | Water | Oil | Water | Oil | Water | Oil | Water | Oil | Water | Oil | Water | Oil | Water | Oil | Water | Oil | Water |
| V-A [c] | 4.0 | 8 | 70 | 4 | 70 | | | | | | | | | | | | | | |
| V-B | 4.0 | | | | | | | 6 | 100 | 0 | 70 | 4 | 70 | 6 | 100 | 0 | 70 | 4 | 70+ |
| | 5.0 | | | | | | | 6 | 80 | 0 | 70 | 4 | 70 | 5 | 70+ | 0 | 70 | 3 | 80 |
| V-C | 4.0 | 5 | 90 | 0 | 70 | | 70 | | | | | | | | | | | | |
| V-D | 4.0 | 7 | 100 | 0 | 70 | 4 | 70 | 7 | 100 | 3 | 70+ | 4 | 80+ | 7 | 100 | 0 | 70 | 4 | 70 |
| | 5.0 | 8 | 100 | 0 | 70 | 4 | 70 | 7 | 100 | 4 | 90 | 5 | 80+ | 8 | 100 | 0 | 70 | 4 | 70 |
| V-E | 4.0 | 8 | 80 | 0 | 50 | 4 | 80+ | | | | | | | | | | | | |
| | 5.0 | 8 | 90 | 2 | 70 | 4 | | | | | | | | | | | | | |
| V-F | 5.0 | 5 | 70 | 0 | 70 | | | | | | | | | | | | | | |
| V-G | 5.0 | 6 | 70 | 4 | 70 | | | | | | | | | | | | | | |
| V-H | 5.0 | 7 | 70 | 2 | 70 | | | | | | | | | | | | | | |
| V-J | 5.0 | 7 | 70 | 2 | 50 | | | | | | | | | | | | | | |
| V-K | 5.0 | 4 | 70 | 0 | 50 | | | | | | | | | | | | | | |
| V-L | 5.0 | 3 | 70 | 0 | 70 | | | | | | | | | | | | | | |
| V-M | 5.0 | 4 | 70 | 2 | 50 | | | | | | | | | | | | | | |

[a] and [b] see Table I.
[c] In place of 6.0% of melamine dispersion, Example II, 1.1% OWB "Phobotex" f./t./c. used an aqueous dispersion of 25% petroleum wax and 75% melamine derivative, Ciba; melamine derivative, Example 1, U.S. Patent 2,783,231.

representative examples. They are applied from aqueous baths and cured as taught in the art to obtain permanent creasing.

Our invention also includes embodiments wherein our defined fluorinated interpolymer, with or without extender polymer, is applied to fibrous materials which materials have already been impregnated with a permanent crease resin, with or without drying and with or without having been permanently creased such as by pressing.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are as follows:

1. An oil and water repellent polymeric composition comprising a fluorinated interpolymer having
   (a) from about 55% to about 70% by weight of units derived from at least one monomer of the structure
   $$CH_2=C(CH_3)CO_2CH_2CH_2R_f$$
   wherein $R_f$ is a perfluoroalkyl group of from four to 14 carbon atoms,
   (b) from about 29% to about 45% by weight of units derived from at least one monomer of the structure
   $$CH_2=C(CH_3)CO_2R$$
   wherein R is an n-alkyl group of predominantly 12 carbon atoms,
   (c) from about 0.1% to about 0.5% by weight of units derived from a monomer of the structure
   $$CH_2=CR'CO_2CH_2CH_2OH$$
   wherein R' is selected from the group consisting of H and $CH_3$, and
   (d) from 0% to about 0.5% by weight of units derived from a monomer of the structure
   $$CH_2=CR'CONHCH_2OH$$
   wherein R' is selected from the group consisting of H and $CH_3$.

2. An oil and water repellent composition according to claim 1 wherein said monomer (b) is n-dodecyl methacrylate.

3. The polymeric composition of claim 1 wherein $R_f$ in component (a) of the fluorinated interpolymer is
   $$F(CF_2)_n-$$
   wherein $n$ is the cardinal numbers 6, 8 and 10 in the weight ratio 3:2:1 and 12 and 14 in amounts of less than 10% of the total amount of
   $$F(CF_2)_n-$$
   and
   wherein component (b) is lauryl methacrylate.

4. An oil and water repellent polymeric composition comprising (1) a fluorinated interpolymer having
   (a) from about 55% to about 70% by weight of units derived from at least one monomer of the structure
   $$CH_2=C(CH_3)CO_2CH_2CH_2R_f$$
   wherein $R_f$ is a perfluoroalkyl group of from four to 14 carbon atoms,
   (b) from about 29% to about 45% by weight of units derived from at least one monomer of the structure
   $$CH_2=C(CH_3)CO_2R$$
   wherein R is an n-alkyl group of predominantly twelve carbon atoms,
   (c) from about 0.1% to about 0.5% by weight of units derived from a monomer of the structure
   $$CH_2=CR'CO_2CH_2CH_2OH$$
   wherein R' is selected from the group consisting of H and $CH_3$, and
   (d) from 0% to about 0.5% by weight of units derived from a monomer of the structure
   $$CH_2=CR'CONHCH_2OH$$
   wherein R' is selected from the group consisting of H and $CH_3$
   and (2) a polymer derived predominantly from at least one polymerizable ester of methacrylic acid, said polymer compositions containing at least 3% by weight of said monomer (a) in polymerized form.

5. A polymer composition according to claim 4 wherein the polymerizable ester for said polymer (2) is 2-ethylhexyl methacrylate.

6. The polymeric composition of claim 4
   wherein $R_f$ in component (a) of the fluorinated interpolymer is
   $$F(CF_2)_n-$$
   wherein $n$ is the cardinal numbers 6, 8 and 10 in the weight ratio 3:2:1 and 12 and 14 in amounts of less than 10% of the total amount of
   $$F(CF_2)_n-$$
   and
   wherein component (b) of the fluorinated interpolymer is lauryl methacrylate; and
   wherein the polymer defined in (2) is derived from 2-ethylhexyl methacrylate and N-methylolacrylamide.

7. A process for treating fibrous materials to impart oil and water repellency and permanent crease potential thereto, which process comprises impregnating said fibrous materials with an aqueous emulsion-bath containing (1) an interpolymer having
   (a) from about 55% to about 70% by weight of units derived from at least one monomer of the structure
   $$CH_2=C(CH_3)CO_2CH_2CH_2R_f$$
   wherein $R_f$ is a perfluoroalkyl group of from four to 14 carbon atoms,
   (b) from about 29% to about 45% by weight of units derived from at least one monomer of the structure
   $$CH_2=C(CH_3)CO_2R$$
   wherein R is an n-alkyl group of predominantly 12 carbon atoms,
   (c) from about 0.1% to about 0.5% by weight of units derived from a monomer of the structure
   $$CH_2=CR'CO_2CH_2CH_2OH$$
   wherein R' is selected from the group consisting of H and $CH_3$, and
   (d) from 0% to about 0.5% by weight of units derived from a monomer of the structure
   $$CH_2=CR'CONHCH_2OH$$
   wherein R' is selected from the group consisting of H and $CH_2$
   and (2) a permanent crease resin, and, optionally, (3) a polymer derived predominantly from at least one polymerizable ester of methacrylic acid present in an amount such that component (a) of the interpolymer defined above comprises at least 3% by weight of the total weight of polymer present; followed by drying the resulting impregnated fibrous material.

8. Fibrous materials obtained according to claim 7.

9. A process for imparting oil and water repellency to fibrous materials containing a permanent crease resin but which have not been permanently creased which process comprises impregnating said fibrous materials with an aqueous polymeric emulsion containing (1) a fluorinated interpolymer having
   (a) from about 55% to about 70% by weight of units derived from at least one monomer of the structure
   $$CH_2=C(CH_3)CO_2CH_2CH_2R_f$$
   wherein $R_f$ is a perfluoroalkyl group of from four to 14 carbon atoms, (b) from about 29% to about 45% by weight of units derived from at least one monomer of the structure $$CH_2=C(CH_3)CO_2R$$

wherein R is an n-alkyl group of predominantly 12 carbon atoms,
(c) from about 0.1% to about 0.5% by weight of units derived from a monomer of the structure $$CH_2=CR'CO_2CH_2CH_2OH$$

wherein R' is selected from the group consisting of H and $CH_3$, and
(d) from 0% to about 0.5% by weight of units derived from a monomer of the structure $$CH_2=CR'CONHCH_2OH$$

wherein R' is selected from the group consisting of H and $CH_3$,
and, optionally, (2) a polymer derived predominantly from at least one polymerizable ester of methacrylic acid, said polymer compositions containing at least 3% by weight of said monomer (a) in polymerized form, followed by drying the resulting impregnated fibrous material.

10. The process of claim 9 followed by permanently creasing the resulting fibrous material.

11. A process for imparting oil and water repellency to fibrous materials which materials have been impregnated with a permanent crease resin and then permanently creased, said process comprising treating said permanently creased fibrous material with an aqueous emulsion of a polymeric composition comprising (1) an interpolymer comprising
(a) from about 55% to about 70% by weight of units derived from at least one monomer of the structure $$CH_2=C(CH_3)CO_2CH_2CH_2R_f$$

wherein $R_f$ is a perfluoroalkyl group of from four to 14 carbon atoms,
(b) from about 29% to about 45% by weight of units derived from at least one monomer of the structure $$CH_2=C(CH_3)CO_2R$$

wherein R is an n-alkyl group of predominantly 12 carbon atoms,
(c) from about 0.1% to about 0.5% by weight of units derived from a monomer of the structure $$CH_2=CR'CO_2CH_2CH_2OH$$

wherein R' is selected from the group consisting of H and $CH_3$, and
(d) from 0% to about 0.5% by weight of units derived from a monomer of the structure $$CH_2=CR'CONHCH_2OH$$

wherein R' is selected from the group consisting of H and $CH_3$, and, optionally,
(2) a polymer derived predominantly from at least one polymerizable ester of methacrylic acid, said polymer compositions containing at least 3% by weight of said monomer (a) in polymerized form, followed by drying the resulting impregnated fibrous material.

References Cited

UNITED STATES PATENTS

| | | |
|---|---|---|
| 3,378,609 | 4/1968 | Fasick et al. |
| 3,356,628 | 12/1967 | Smith et al. |

MURRAY TILLMAN, Primary Examiner

H. ROBERTS, Assistant Examiner

U.S. Cl. X.R.

8—115.6, 115.7, 116, 116.3; 117—135.5, 138.8, 139.4, 161; 260—29.4, 29.6, 80.73, 851, 856

10-1050
(5/69)

UNITED STATES PATENT OFFICE
CERTIFICATE OF CORRECTION

Patent No. 3,491,169             Dated  January 20, 1970

Inventor(s)   STUART RAYNOLDS AND ROBERT EMMS READ

It is certified that error appears in the above-identified patent and that said Letters Patent are hereby corrected as shown below:

Col. 7, lines 47 and 48, delete "a permanent crease resin sold by Sun Chemical, believed to have the structure:" and insert -- drochloride salt of Ethomeen, a polyamineethylene oxide condensate having the structure --.

SIGNED AND
SEALED
AUG 25 1970

(SEAL)
Attest:

Edward M. Fletcher, Jr.
Attesting Officer

WILLIAM E. SCHUYLER, JR.
Commissioner of Patents